Patented May 22, 1951

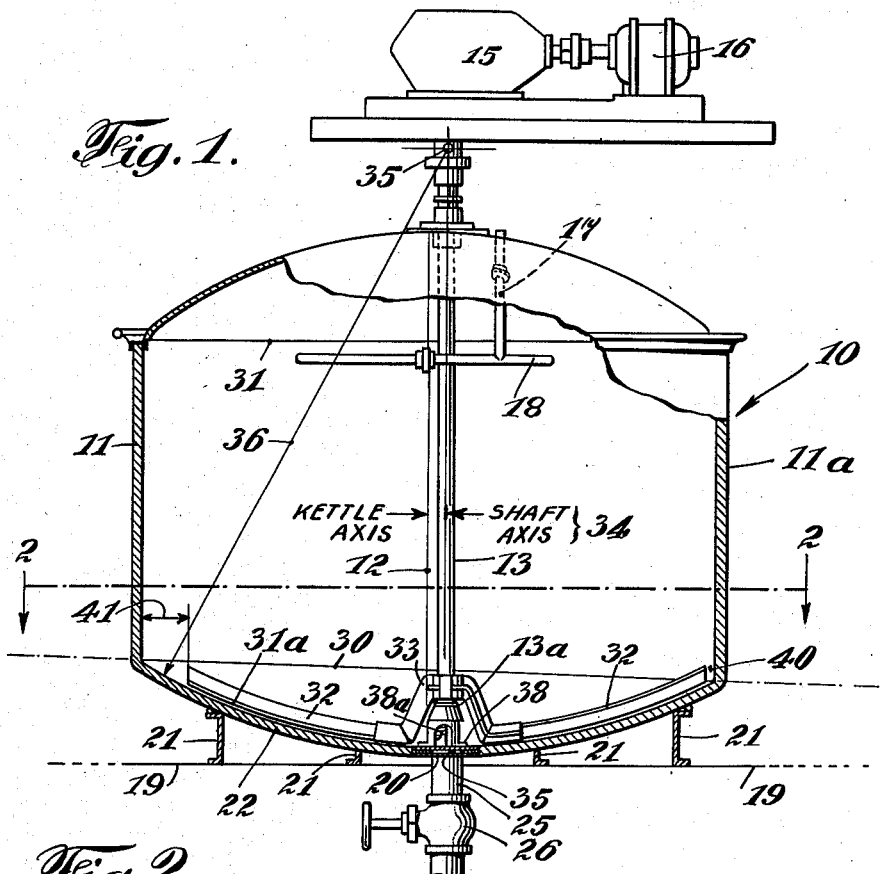
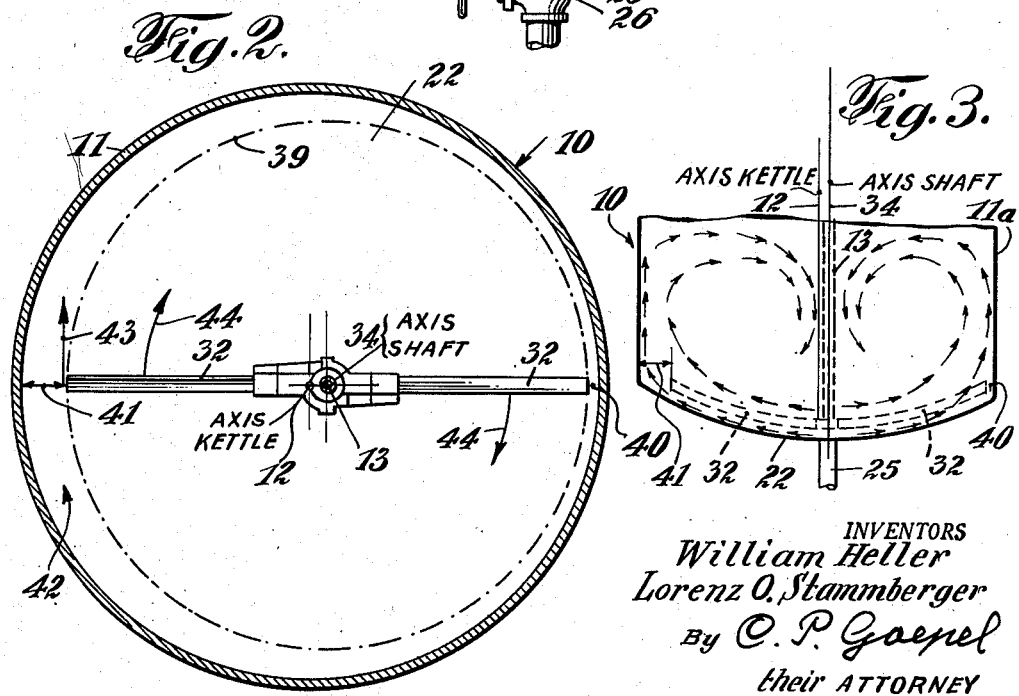

2,553,582

UNITED STATES PATENT OFFICE 2,553,582

CEREAL AND MASH COOKER

William Heller, Packanack Lake, N. J., and Lorenz O. Stammberger, Milwaukee, Wis.; said Heller assignor to Schock, Gusmer & Co., Inc., Hoboken, N. J., a corporation of New Jersey Application May 22, 1950, Serial No. 163,466

2 Claims. (Cl. 259—107)

This invention relates to cereal and mash cookers for breweries.

Heretofore in the fuse of cookers of cylindrical containers with stirrers, it was not possible to achieve a completely satisfactory mix, or a satisfactory distribution of heat. Various efforts have been made to overcome these inherent disadvantages, but none were entirely satisfactory.

The object of the invention is to provide improved means for mixing cereal and mash in less time than heretofore and in a thorough manner.

The invention contemplates a cylindrical container with a bottom disposed at an angle to the axis of the container, and having a propeller acting on an axis displaced from the container axis, in the direction of the lower end of the bottom. Due to the cooperation of these changes over the previously proposed or used kettles or containers, the contents, such as cereals or mash, is subjected to certain movements which bring about a heat exchange in the shortest time and in a most efficient manner, as also a thorough mixing in a relatively short time.

The invention consists of a cylindrical container or kettle having a propeller rotated around a axis disposed radially a short distance from the axis of the container, and having a bottom askew to the axis of the container, whereby the contents is subjected to eccentric movements radially and axially of the container, and the mass is subject to physical laws other than mere centrifugal forces, as is the case when the axis of the kettle and the axis of rotation are coincident with a co-centric bottom. The invention consists further in the improved bottom which instead of being symmetrical with the axis of the container is asymmetrical thereto, with the deeper portion at the offset axis of rotation side. This provides a vertical up and down wave movement of the mass in addition to the rotary movement of the mass during the rotation of the mass.

The invention will be more fully described hereinafter, an embodiment thereof shown in the drawings, and the invention will be finally pointed out in the claims.

In the accompanying drawings,

Fig. 1 is a central section of a kettle having a propeller, with the invention embodied therein;

Fig. 2 is a horizontal section taken on line 2—2 of Fig. 1; and

Fig. 3 is a diagrammatic side view of the mass with the propeller shown in dotted lines.

Similar characters of reference indicate corresponding parts throughout the various views.

Referring to the drawings, the known kettle 10 has a cylindrical upright wall 11, with a central vertical axis 12. A shaft 13 has a propeller 32, formed of two diametrically disposed blades, which may be more or less in number, of any suitable contour. The propeller 32 is fastened to the shaft 13, at 33. The shaft 13 is supported on a bearing 13a, which in turn is supported on a tube-like support 38 with openings 38a for the passage of the mash, into an opening 20 of the bottom 22, to the lower side of which a pipe 25 with a valve 26, is attached, by which the kettle may be emptied. The upper end of the shaft 13 extends through the top of the kettle, and is connected with a suitable driving mechanism 15 operated by a motor 16, not shown in detail, as known. The driving mechanism may be arranged below the kettle as known. A water supply pipe 17 and distributing ring 18 is provided.

The kettle is supported on a flooring 19 or the like, by suitable channels, or L beams 21.

The foregoing is known. The improvement consists in the bottom 22 in cooperation with the vertical sides of the kettle. The vertical side 11 of the kettle is shorter than the opposite vertical side 11a of the kettle, and the lower end of the kettle (assuming the bottom removed), is along the line 30, which is at an angle to the horizontal, and more particularly to an angle to the top horizontal 31. Also, it may be added, the inclined line 30 is at an angle to the horizontal floor line, as emphasized by the dotted line extensions of the line 30 and the flooring 19.

The axis of rotation 34 of the shaft 13, is spaced from the central axis 12 of the kettle in the direction of the lower end of the bottom.

The center of curvature 35 of the inner curved surface of the bottom 22 is on the axis of rotation 34 of the shaft 13, and the radius of curvature is indicated by 36. Thus, as the center of curvature 35 is on the axis of rotation 34 of the propeller 32, the lower edges of the propeller blades and the inner surface of the bottom are concentrically parallel. The propeller blade has one end, in the case of a blade propeller shown, as near to the wall 11a as possible, as shown by the space 40 (Fig. 2), and a considerably larger space 41 between the other end of the propeller and the wall 11 of the kettle. The ends of the propeller thus pass in an orbit 39, as shown in Figure 2. In consequence, the portion of the contents generally indicated by 42 (Fig. 2) is not directly acted upon by the propeller. Indirectly, however, this portion 42 is acted upon as it has been projected centrifugally by the propeller substantially radially outwardly against the vertical cylindrical wall of the kettle under simultaneous rotary movement of the mass in the kettle as indicated by the arrows 44, the force of which at the end of the propeller being indicated by the arrow 43. The rotating mass under centrifugal action against the vertical walls, causes the mass to move upwardly along the wall of the kettle, and then inwardly, centripetally to the shaft, where a vortex is formed, drawing the mass downwards, for re-centrifugalization, as before stated. (Fig. 3.)

Without limiting the invention to the dimensions now to be stated, a container of the following dimensions has given satisfaction: A diameter of 13' 6"; one vertical height of 7' 5"; the diametrically opposed vertical of 7', with the upper ends of the diametrically opposed vertical sides on a horizontal. The curvature of the bottom is on a radius of 14' 5½", whereby the lower ends of the opposed vertical sides, where the bottom joins the vertical are on a line 30 inclined to the horizontal at about an angle of 3°. In other words, the lower end of one sidewall is 2' 1", and the lower end of the opposed sidewall is 18", from a horizontal passing through the inside lowermost portion of the container.

Thus, Fig. 2 shows two circles with eccentric centers, with one circle having a smaller diameter than the other, entirely within the larger circle leaving a crescent like space 42 between the circles, when seen in plan (Fig. 2). The plane of the smaller circle is horizontal, and the plane of the larger circle is at an inclination to the horizontal (Fig. 1).

The shorter side of the bottom being lower than the other or longer, diametrically opposite side (Fig. 1), gravity assists in moving the grains of the mash to the lower side. The propeller moves them into the narrower restricted part of the crescent, where a relative compacting takes place. In the adjacent and succeeding part of the crescent like space 42, the space gradually enlarges while the mass is still at the lower part of the bottom, until the mass reaches the widest part at the upper part of the bottom. The crescent narrows, while the mass moves from the upper part of the bottom, towards the lower part of the bottom. This increase and decrease in planular space is compensated for by the decrease and increase in vertical volume, due to the askew bottom being higher where the space 40 is largest and lower where the space 40 is smallest.

It will be noted particularly that the depth of the mass at one periphery along the line passing through both axes (kettle axis and shaft axis), is less than the depth at the other periphery or diametrically opposite line; and that the length of the same line from the axis of rotation 13 to the higher part of the bottom is longer than the length of the line from the center of rotation 13 to the lower part of the bottom.

In a plane perpendicular passing through the axis 13 and perpendicular to the line passing through the kettle axis and shaft axis, the space 40 at each end of the diameter is substantially the same, as also the respective depth of the mass.

A cutting of a cylinder by an inclined plane provides an elliptical intersection, and the improved bottom follows the elliptical perimeter.

The elliptical rim portion of the body portion is in registration with the rim portion of the bottom and the registering rim portions at one end of a diameter are lower than those at the other end of said diameter, and the registering rim portions at the ends of a diameter at right angles to said first diameter are on the same level. The interior surface of the bottom is concave, extending inwardly from its rim portion.

The operation of the device is as follows:

Water and cereal, or water and malt (mash), is supplied to the kettle in the proper proportions as known and to the level desired. The propeller is rotated. By the rotating mass moving through the part 42 the particles have a tendency to separate and thus the water is permitted to pass between the particles. As the mass moves against and towards the lower side of the askew bottom, the same action again takes place. Thus, a wetting action and hence a good mixing is obtained by the alternate extensions and restrictions. The stirring is continued until a satisfactory mix is obtained, which the skilful attendant recognizes from experience. The desired quality of mix is obtained in less time than heretofore.

These cookers, as known, are used either with live steam direct heating or with jacketed indirect heating. By providing a quick and complete mix throughout the mass, the applied heat will act quicker upon the mass than heretofore, and also give an evenly distributed heat exchange throughout. Also, with the thorough mix obtained by the use of the invention, burning is prevented. The importance of the thorough mix referred to consists in the homogeneous dispersal of the cereals, for example, in the water, avoiding conglomeration of the cereals.

From the foregoing it is seen that there has been described an apparatus for mixing a fluent mass composed of solid particles suspended in a liquid, in which the combination consists of a chamber of circular cross section having vertically disposed cylindrical walls and a concave bottom in the form of a spherical segment having a cord plane which is inclined with respect to the axis of said chamber, whereby the lowest point in said bottom is eccentrically disposed with respect to the axis of said chamber, a drain disposed at said lowest point of said bottom, an impeller shaft rotatably mounted in parallel relation to the axis of said chamber and in axial alignment with said drain, radial mixing arms secured to said impeller shaft to rotate therewith, said mixing arms being curved to conform with and being disposed close to the concave surface of said bottom and having a length sufficient to closely approach the wall of said chamber on the side thereof nearest said drain, said impeller arms in motion being adapted to sweep a surface of revolution substantially uniformly spaced from the concave surface of said bottom and in close proximity thereto over a circular area concentric with said drain and substantially tangent with the wall of said chamber on the side thereof nearest said drain, said bottom having a crescent shaped portion not swept by said impellers disposed on the side of said chamber which is more remote from said drain, said unswept portion being entirely above the swept portion of said bottom.

We wish it to be understood that we do not desire to be limited to the exact details of construction shown and described, for obvious modifications will occur to a person skilled in the art.

We claim:

1. In a cereal or mash cooker for breweries, having a container of a cylindrical body portion with a vertical central axis, a bottom for said body portion, a propeller shaft within the container having a vertical axis of rotation offset from said central axis, and a propeller for said shaft, the combination of a rim portion at the lowest end of said body portion of elliptical peripheral contour, and a rim portion at the uppermost end of said bottom of elliptical peripheral contour, said bottom having a spherical concave interior surface extending inwardly from its rim portion, the center of curvature of which surface is on said propeller axis, said rim portions registering with each other, with the end of the major axis of said rim portions lower than that of the other end of the major axis, and the ends of the minor axis of said rim portions on the same level, said propeller having its lower surface concentric with a meridian of said spherical surface, the end of said propeller when aligned with the lower end of the major axis, spaced its smallest distance from the adjacent registering rim portions, and when aligned with the upper end of said major axis spaced its largest distance from the adjacent registering rim portions, said space increasing from the smallest to the largest space and decreasing from the largest to the smallest space during the rotation of the propeller, the end of the propeller acting on a deeper mass of contents at said narrowest distance than at said largest distance.

2. In an apparatus for mixing a fluent mass composed of solid particles suspended in a liquid, the combination comprising a chamber of circular cross section having vertically disposed cylindrical walls and a concave bottom in the form of a spherical segment said cylindrical walls and said spherical bottom having a line of intersection corresponding to the intersection of a corresponding cylinder and a corresponding sphere, and said bottom having a chord plane approximating said line of intersection, which is inclined with respect to the axis of said chamber, whereby the lowest point in said bottom is eccentrically disposed with respect to the axis of said chamber, a drain disposed at said lowest point of said bottom, an impeller shaft rotatably mounted in parallel relation to the axis of said chamber and in axial alignment with said drain, radial mixing arms secured to said impeller shaft to rotate therewith, said mixing arms being curved to conform with and being disposed close to the concave surface of said bottom and having a length sufficient to closely approach the wall of said chamber on the side thereof nearest said drain, said impeller arms in motion being adapted to sweep a surface of revolution substantially uniformly spaced from the concave surface of said bottom and in close proximity thereto over a circular area concentric with said drain and substantially tangent with the wall of said chamber on the side thereof nearest said drain, said bottom having a crescent shaped portion not swept by said impellers disposed on the side of said chamber which is more remote from said drain, said unswept portion being entirely above the swept portion of said bottom.

WILLIAM HELLER.
LORENZ O. STAMMBERGER.

REFERENCES CITED

The following references are of record in the file of this patent:

UNITED STATES PATENTS

| Number | Name | Date |
|---|---|---|
| 1,772,898 | Jensen | Aug. 12, 1930 |
| 1,995,465 | Bigelow et al. | Mar. 26, 1935 |
| 2,136,936 | Cohen | Nov. 15, 1938 |
| 2,321,453 | Bodeau | June 8, 1943 |

FOREIGN PATENTS

| Number | Country | Date |
|---|---|---|
| 455,891 | Great Britain | Oct. 29, 1936 |